United States Patent
Li

(10) Patent No.: US 7,711,162 B2
(45) Date of Patent: *May 4, 2010

(54) ACCELERATED TEXTURE-BASED FUSION RENDERER

(75) Inventor: Wei Li, East Brunswick, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1248 days.

This patent is subject to a terminal disclaimer.

(21) Appl. No.: 11/235,410

(22) Filed: Sep. 26, 2005

(65) Prior Publication Data

US 2010/0080429 A1   Apr. 1, 2010

Related U.S. Application Data

(60) Provisional application No. 60/647,713, filed on Jan. 27, 2005.

(51) Int. Cl.
  *G06K 9/00*   (2006.01)
  *G06K 9/32*   (2006.01)
  *G06T 15/40*  (2006.01)

(52) U.S. Cl. .................. 382/128; 382/294; 345/421

(58) Field of Classification Search ......... 382/128–132, 382/241, 293–294; 345/424, 419, 423
  See application file for complete search history.

(56) References Cited

U.S. PATENT DOCUMENTS

| | | | | |
|---|---|---|---|---|
| 4,835,712 | A * | 5/1989 | Drebin et al. | 345/423 |
| 4,985,856 | A * | 1/1991 | Kaufman et al. | 345/424 |
| 5,381,518 | A * | 1/1995 | Drebin et al. | 345/424 |
| 6,304,266 | B1 * | 10/2001 | Li | 345/424 |
| 6,654,012 | B1 * | 11/2003 | Lauer et al. | 345/424 |
| 7,120,289 | B2 * | 10/2006 | Baumberg | 382/154 |
| 7,190,364 | B2 * | 3/2007 | Engel | 345/423 |
| 2002/0190984 | A1 * | 12/2002 | Seiler et al. | 345/424 |

OTHER PUBLICATIONS

Li et al. Texture Partitioning and Packing for Accelerating Texture-based Volume Rendering. Graphics Interface. 2003.*
Li et al. Empty Space Skipping and Occlusion Clipping for Texture-Based Volume Rendering. Proceedings of the 14th IEEE Visualization 2003. 2003. pp. 317-324.*

(Continued)

*Primary Examiner*—Wesley Tucker
*Assistant Examiner*—Andrae S Allison
(74) *Attorney, Agent, or Firm*—Donald B. Paschburg; F. Chau & Associates, LLC

(57) ABSTRACT

An exemplary method of combining two images to form a fused image is provided. A hierarchical structure for each of a plurality of volumes is built. All blocks in each of the hierarchical structures that intersect a slicing plane are found. Each of the plurality of volumes is divided into stacks of parallel slices, and the parallel slices are sorted by visibility order. A next slice in the sorted parallel slices is chosen. The next slice belongs to a current volume. Rendering parameters are changed if the current volume is different from a previous volume associated with the chosen slice in a previous iteration of the step of choosing the slice. Based on the rendering parameters, the next slice is rendered by intersecting the slicing plane with the blocks corresponding to the current volume. The steps of choosing the slice, changing the rendering parameters, and rendering the slice are repeated until all of the sorted parallel slices are rendered.

20 Claims, 5 Drawing Sheets

OTHER PUBLICATIONS

Boada et al. Mutiresolution Volume Visualization with a Texture-Based Octree. The Visual Computer, 2001. pp. 185-197.*

LaMar et al. Multiresolution Techniques for Interactive Texture-based Volume Visualization. Proceedings of the 10th IEEE Visualization 1999 Conference. 1999.*

Yizhou Yu., "Efficient Visibility Processing for Projective Texture Mapping." Computer & Graphics, vol. 23, pp. 245-253 (1999).*

Garrett et al, "Real-Time Incremental Visualization of Dynamic Ultrasound Volumes Using Parallel BSP Trees", Proceedings of the 7th IEEE Visualization Conference, 1996.*

* cited by examiner

ACCELERATED TEXTURE-BASED FUSION RENDERER

CROSS-REFERENCE TO RELATED APPLICATIONS

This application claims priority to U.S. Provisional Application No. 60/647,713, which was filed on Jan. 27, 2005, and which is fully incorporated herein by reference.

BACKGROUND OF THE INVENTION

1. Field of the Invention

The present invention relates generally to the field of imaging, and, more particularly, to an accelerated texture-based fusion renderer.

2. Description of the Related Art

Modern medical technology provides different modalities for acquiring 3D data, such as computed tomography ("CT"), magnetic resonance imaging ("MRI"), positron emission tomography ("PET"), and ultrasound. The information obtained from different modalities is usually complementary; for example, CT provides structural information while PET provides functional information. Thus, it is generally desirable to fuse multiple volumetric datasets.

FIG. 1 presents a sample fused image where functional data from PET is correlated with structural information from CT. FIG. 1 shows a sample fused rendering. The image on the left (FIG. 1(a)) shows structural information derived from a 512×512×512×12-bit CT dataset, while the image in the center (FIG. 1(b)) shows functional information derived from a 256×256×256×16-bit dataset PET dataset. The image on the right (FIG. 1(c)) is a simple fusion of the CT and PET datasets correlating structural and functional information. The "negatives" of each of the images is shown to facilitate printed reproduction.

Most existing fusion renderers require that all volumes be aligned and have the same resolution, thereby necessitating that all volumes be re-sampled except the one that is treated as the reference volume. The reference volume generally refers to the volume with the finest resolution to avoid losing information—the other volumes are re-sampled according to the grid of the reference volume. The reference volume may need to be expanded to fill the bounding box enclosing all volumes. The aggregate bounding box of the ensemble of volumes can be significantly larger than individual bounding boxes when the orientation of a volume happens to lie near the diagonal of another volume. The number of voxels after re-sampling is proportional to the volume of the aggregate bounding box. Therefore, re-sampling can significantly increase the processing time (both initially and for each rendering) as well as the amount of memory required.

The volumes usually need to be registered because different scanners can have different coordinate systems (in terms of origins and orientations). During registration all volumes, except the reference volume, are referred to as floating volumes. Various transformations, such as rotation, translation, scaling, and shearing, are applied to the floating volumes so that their features match those in the reference volume. Furthermore, re-sampling must be performed again after such a transformation. Registration typically requires user interaction, with visual feedback, that is repeatedly applied to refine the registration. The resample-based fusion render cannot response quickly enough for such requirements.

SUMMARY OF THE INVENTION

A method of combining two images to form a fused image is provided. The method includes the steps of: (a) building a hierarchical structure for each of a plurality of volumes; (b) finding all blocks in each of the hierarchical structures that intersect a slicing plane; (c) dividing each of the plurality of volumes into stacks of parallel slices and sorting the parallel slices by visibility order; (d) choosing a next slice in the sorted parallel slices, the next slice belonging to a current volume; (e) changing rendering parameters if the current volume is different from a previous volume in a previous iteration of step (d); (f) rendering, based on the rendering parameters, the next slice by intersecting the slicing plane with the blocks corresponding to the current volume; and (g) repeating steps (d)-(f) until all of the sorted parallel slices are rendered.

A machine-readable medium having instructions stored thereon for combining two images to form a fused image is provided. The method includes the steps of: (a) building a hierarchical structure for each of a plurality of volumes; (b) finding all blocks in each of the hierarchical structures that intersect a slicing plane; (c) dividing each of the plurality of volumes into stacks of parallel slices and sorting the parallel slices by visibility order; (d) choosing a next slice in the sorted parallel slices, the next slice belonging to a current volume; (e) changing rendering parameters if the current volume is different from a previous volume in a previous iteration of step (d); (f) rendering, based on the rendering parameters, the next slice by intersecting the slicing plane with the blocks corresponding to the current volume; and (g) repeating steps (d)-(f) until all of the sorted parallel slices are rendered.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF PREFERRED EMBODIMENTS

Figure 1:
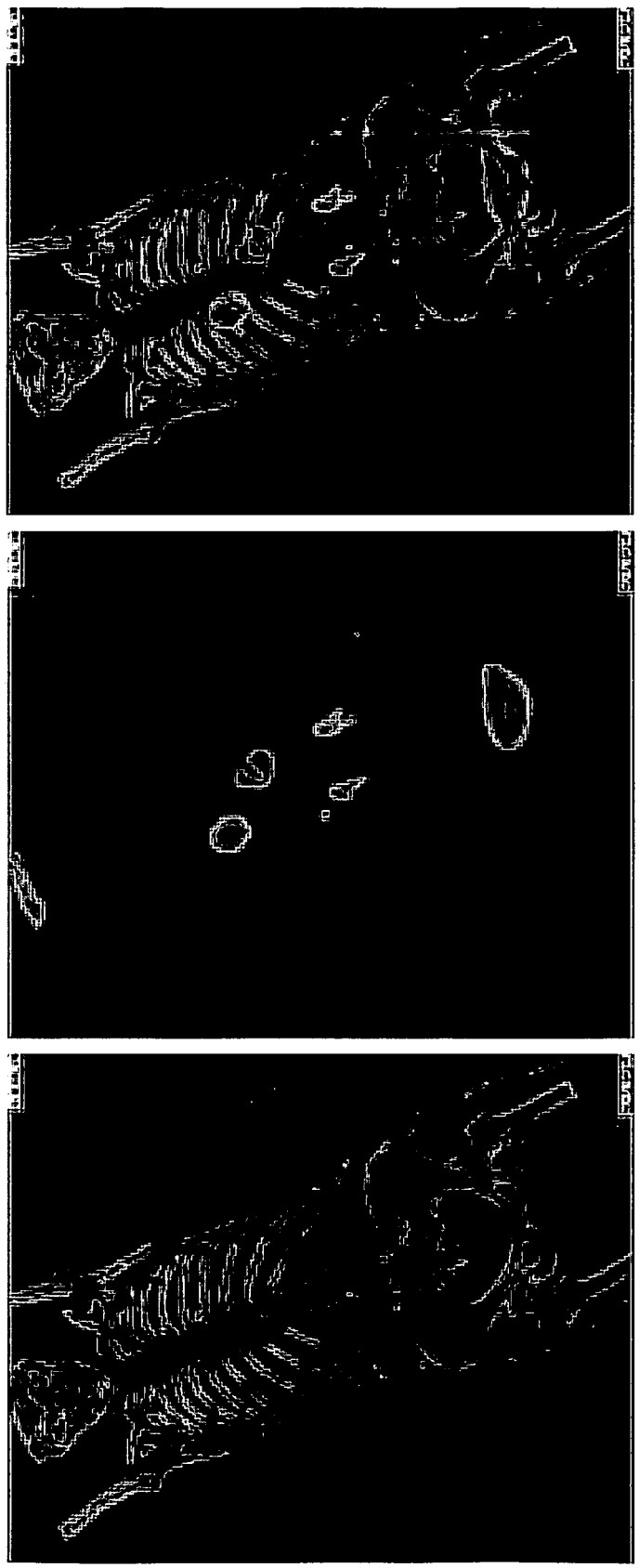
FIG. 1 depicts an exemplary fused image according to the prior art.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

Figure 2:
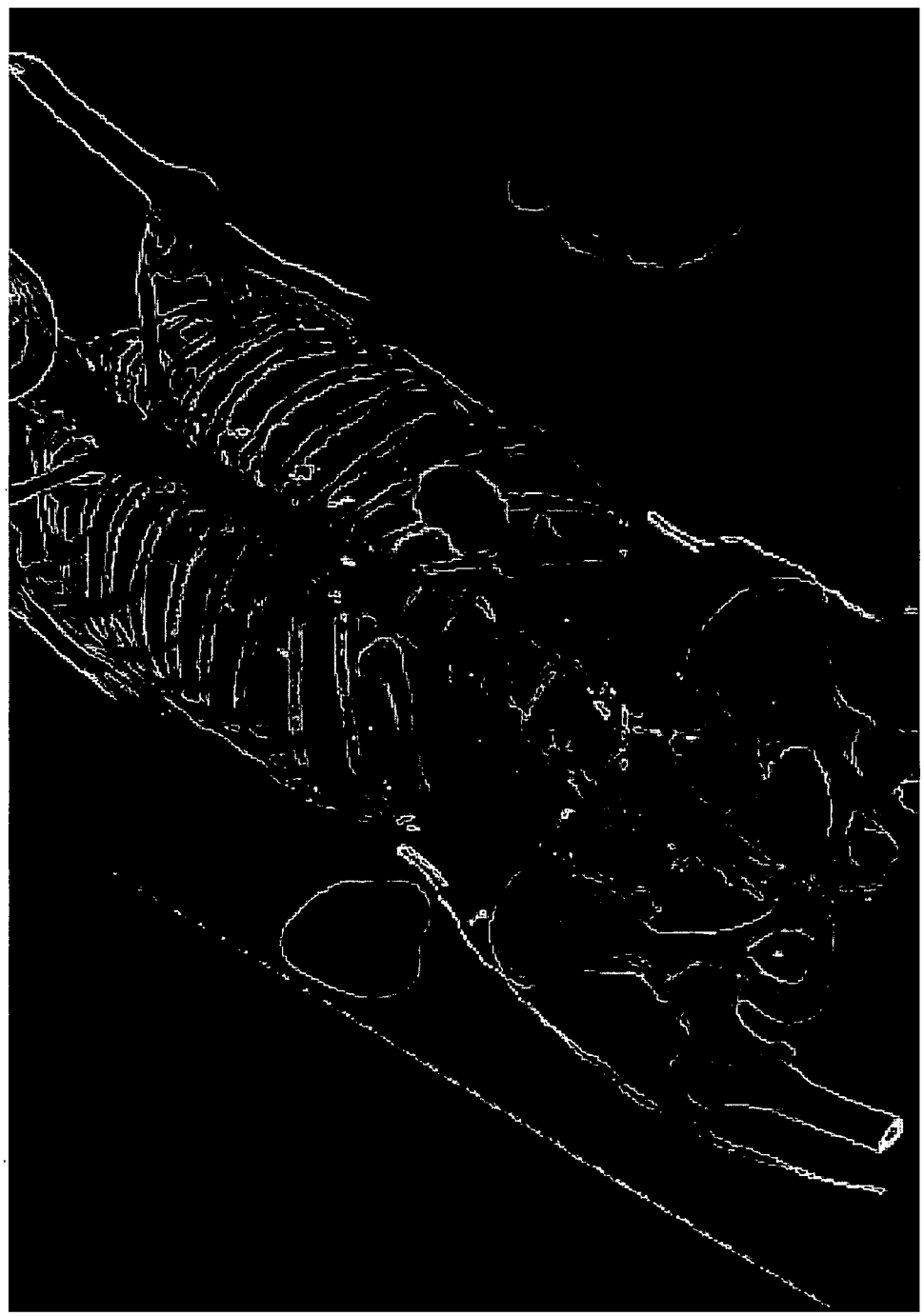
FIG. 2 depicts an exemplary fused image, in accordance with one embodiment of the present invention.

We present exemplary embodiments of a novel fusion renderer which avoids the resampling necessary in the prior art. In our fusion renderer, each volume is treated as a stack of two-dimensional ("2D") slices. All the slices are parallel to each other. That is, no two slices intersect each other, although two slices may lie on the same plane. During rendering, these slices are sorted in visibility order and then composited. This is similar to standard texture-based volume rendering of a single volume. FIG. 2 shows the result of the two volumes of FIGS. 1(a) and 1(b) transformed independently in our fusion renderer without resampling as a preprocess step. In other words, the resampling is done on-the-fly, which is similar to the integrated registration and visualization as Nadeau, "Volume Scene Graphs", Proceedings of the 2000 IEEE Symposium on Volume Visualization, pp. 49-56, ACM Press, 2000, the disclosure of which is fully incorporated herein by reference. However, an important consideration for the present invention is to incorporate invisible space skipping to the fusion renderer.

When switching from a slice from one volume to a slice from another volume, the fusion renderer can switch to a different shading mode or a different transfer function. That is, different volumes can be rendered in different shading modes with different transfer functions, while the volumes are fused together.

Recently, texture-based volume rendering has become the most popular volume rendering technique due to its speed advantage over a software-based approach (e.g., ray casting), and due to its cost advantage over customized hardware (e.g., VolumePro™). Previously, space leaping and occlusion culling were both applied to texture-based volume rendering in object order. A primary principal is to divide a large volume into many smaller sub-volumes. Sub-volumes containing only fully empty voxels or sub-volumes that are fully occluded by other sub-volumes are skipped for rendering, thereby gaining speedup. Each sub-volume is then rendered as a stack of slices, as in standard texture-based volume rendering. Usually, the sub-volumes are rendered in visibility order, which we refer to as box-by-box order. The bounding box of each sub-volume is aligned with that of the original dataset. Therefore, box-by-box order cannot be used for multiple overlapped volumes, because each volume may have arbitrary orientation. In the present invention, we present a technique called slice-by-slice invisible space skipping, which avoids all the sub-volumes that are completely invisible, while the sub-volumes of each volume can have arbitrary orientation. The sub-volumes may be completely invisible due to emptiness, occlusion, being clipped by a crop box or cutplanes, or falling outside of the view frustum.

The novel fusion renderer presented herein renders all the volumes slice-by-slice, and fuses voxels from different volumes on-the-fly. The renderer does not resample any dataset. For each slice from any volume, the renderer skips all the invisible portions, including the empty region, the occluded region, and the region being removed by a crop box, cutplanes, or masks. The invisible space skipping of one volume is completely independent of the skipping of other volumes. Each volume can have an independent crop box and cutplanes. The fusion renderer also allows any volume to be bigger than the graphics memory by utilizing the bricking technique. To guarantee that each visible voxel is only rendered once, we insert internal clip planes. The actual size of the volume and the number of volumes are only limited by the available physical memory.

Slice-by-Slice Invisible Space Skipping

To properly fuse multiple overlapped volumes, each volume is treated as a stack of 2D slices. All the slices are parallel to each other. That is, no two slices intersect each other, although the two slices may lie on the same plane. Although not so limited, a user may choose the slices to be view-aligned. In practice, once can also choose to align the slices with one of the volumes. This results in better cache coherence when fetching voxels from that volume, if the fetching from the particular volume dominates the fetching from other volumes. During rendering, these slices are sorted in visibility order before compositing. If occlusion culling or early ray termination is enabled, these slices have to be rendered from front to back.

To skip invisible regions, each volume is divided into many sub-volumes as described in the related U.S. patent application, Wei Li, "Invisible Space Skipping with Adaptive Granularity for Texture-based Volume Rendering", Ser. No. 11/235,409 filed on Sep. 26, 2005, which is fully incorporated herein by reference. The size of the sub-volumes controls the load balance between the vertex and the fragment processor of graphics processing units ("GPUs"). The smaller the sub-volumes, the more accurate the renderer skipping invisible regions, but the more vertices being transformed by the vertex processor. To achieve a best performance, we use an adaptive granularity of the sub-volumes. First, we create the sub-volumes of the finest granularity, that are the smallest sub-volumes the renderer will handle. For convenience, the total number of the smallest sub-volumes is a power-of-two. Then we create larger sub-volumes by merging the smallest sub-volume neighbors. This builds the second finest level of granularity. The process is done recursively until we get the roughest granularity, when there is only one sub-volume in a whole level, and the sub-volume is the same size as the original dataset. These sub-volumes form an orthogonal binary space partitioning ("BSP") tree. We then choose the appropriate granularity of sub-volumes for rendering by moving up-and-done the BSP tree levels. The sub-volumes can also be organized using other hierarchical data structure, such as an octree. We choose a binary tree only because it is guaranteed that each internal node has two children while all the leaf nodes have none. The size of sub-volume of one dataset can be different from the size of another dataset, and the BSP tree of one volume is completely independent from those of other volumes.

To render a single volume, it is natural to render sub-volume by sub-volume after sorting them in visibility order, and the sorting is done naturally with the BSP tree. This is referred to as block-by-block rendering. However, for the novel fusion renderer, block-by-block rendering is obviously not an option because the axes of different volumes may not be aligned. To enforce proper visibility order, we have to render slice-by-slice. Therefore, in the present invention, for each slicing plane, we find all the intersections of the plane with all the sub-volumes of the proper granularity. Typically, there are hundreds slicing planes and thousands of sub-volumes, and it is desirable that the intersections be done very efficiently. We now describe such an efficient approach.

The total cost of intersection computation of the slice-by-slice order is the same as that of the box-by-box order plus the cost to determine which sub-volumes are intersected by a given slicing plane. The basic idea of this exemplary method is to skip sub-volumes that do not intersect with the current slicing plane with very simple tests. The intersection is done in the so-called slicing coordinates, in which the Z-axis is orthogonal to the slice planes. In such a coordinates system, the plane equations of the slicing plane have the form $z+D=0$, where D is the distance from the origin to the plane. Then, to determine whether a sub-volume is intersected by a slicing plane, we only need to compare the maximum and the minimum Z values of the sub-volume's bounding box in the slicing coordinates with the distance of the plane to the origin. The Z range of a bounding box is uniquely determined by two vertices of the bounding box. We refer to the two vertices as the nearest and the farthest vertices. For either an orthogonal or a perspective projection, the indices of the nearest and the farthest vertices are the same for all the sub-volumes of the same volume. The indices of the nearest and the farthest vertices are determined by transforming the eight (8) vertices of a sub-volume to the slicing coordinates and then comparing the transformed Z coordinates. The indices of the nearest and the farthest vertices are computed at the beginning of each frame, and it is just a per-frame cost.

We traverse the BSP tree top-down and in breadth-first order. The fusion renderer determines the intersection for each node that is traversed. If one node does not intersect with a plane, none of the node's children can intersect with the same plane, and the sub-tree from the node can be skipped completely. The nearest and the farthest vertices of any sub-volume are transformed into the slicing coordinates on-demand. Only the Z values are computed, which requires three multiplications and three additions per vertex, and the Z values are cached for other slicing planes. While traversing the tree, the renderer finds the largest sub-volumes that satisfy certain criteria. Exemplary criteria includes whether sub-volumes contain enough non-empty voxels and non-occluded voxels, are intersected by the slicing plane, are not completely clipped by cut-planes, or are not completely cropped by the crop box. Once such a node is found, all of its children are skipped. Similar to the intersection, if a node is fully empty, occluded, clipped or cropped, the whole sub-tree rooted from the node is skipped. Therefore, for each sub-volume, the additional cost of slice-by-slice order rendering is the cost of transforming the Z coordinates for two vertices per frame (i.e., 6 multiplications and 6 additions), and two comparisons per slice. Usually, a large percentage of sub-volumes in the BSP tree are skipped for these computations due to emptiness, occlusion, clipping/cropping, or one of their ancestors are skipped or selected. Sub-volumes falling outside of the current view frustum are not rendered. The novel fusion renderer inserts four internal cut-planes, each aligned with one of the four sides of the view frustum. These internal cut-planes are treated in the same fashion as user-defined cut-planes, except that the internal cut-planes are removed after the rendering.

We use the occlusion query of OpenGL to determine whether a sub-volume is fully occluded and should be skipped for rendering. Because it is much more efficient to issue multiple queries before retrieving results than querying and retrieving one-by-one, occlusion information is obtained before-hand, rather than on-demand as with intersection and clipping. We divide the slicing planes into several groups, each with the same number of slices. Before rendering each group of slices, the sub-volumes intersecting by those slices are queried. The query is done by rendering the front faces of the bounding box. All of the fragments pass a fragment program that reads the frame buffer. If the opacity of a frame buffer pixel is greater than a threshold, the corresponding fragments are discarded. The occlusion query returns the count of pixels that reaches the frame buffer. If the count is 0, the sub-volume is fully occluded. Finding the sub-volumes intersecting a group of parallel planes is essentially finding the sub-volumes fully or partially falling between the front-most and the back-most planes. Again, this is done in the slicing coordinates, by comparing the Z ranges of the sub-volumes with the distance-to-origin of the planes. Again, the Z ranges are computed on-demand, and cached for future usage, such as for determine whether a sub-volume is intersected by a plane.

We use sub-volume filter to control the traversal of a BSP tree. The filter provides two functions: is Good( ) determines whether a node satisfies the criteria; and skipChildren( ) determines whether the children of the current node should be avoid for traversal. Following is the pseudo-code representing our slice-by-slice space leaping.

```
bool isGood(const BspTree& node)
{
    if(!isIntersecting(node))
        return FALSE;
    if(isFullyClipped(node)||is FullyCropped(node)
        return FALSE;
    return (node.getSolidness( )>=solidThresh && node.
        getVisibility( )>=visibleThresh||(node.isLeaf( )&&
        node.getSolidness( )>=nonEmptyThresh && node.
        getVisibility( )>=nonOcclusionThresh));
}
bool skipChildren(const OrthoBspTree& node, bool
    curNodeGood)
{
    return curNodeGood||node.getSolidness( )<=nonEmpty
        Thresh||node.getVisibility(       )<=nonOcclusion
        Thresh||!isIntersecting(node)||if(isFullyClipped
        (node)||isFullyCropped(node));
}
```

In the is Intersecting ( )method, the min/max Z values in the slicing coordinates of the current sub-volume are fetched or computed, and are compared with the Z-distance of the current slicing plane. The isFullyClipped( ) and is Fully Cropped( ) methods are implemented in a similar fashion.

```
bool isIntersecting(const ivtOrthoBspTree& node, float
    planeZ)
{
  FLT32 minZ, maxZ;
  if(!node.isZRangeSet( ))
  {
    computeZRange(minZ, maxZ);
    node.setZRange(minZ, maxZ);
  }
  else
    node.getZRange(minZ, maxZ);
  return minZ<=planeZ && maxZ>=planeZ);
}
```

Rendering of Multiple Volumes

First, let us assume the fusion rule is just alpha blending or anything that can be implemented as a blending function. We will discuss an arbitrary fusion rule later. As mentioned before, each volume is treated as a stack of 2D slices extracted from the corresponding three-dimensional ("3D") volume. All of the slices are parallel to each other. Then these slices are composited in visibility order, either back-to-front or front-to-back. In this way, the sampling rate of each volume can be completely independent from each other.

The following is the corresponding pseudo-code. The while loop renders all the slices. Inside the loop, first the FindNextSlice( ) function returns the volume index and the position of the next slice. If all of the volumes do not fit in the graphics memory, and the returned volume index is different from that of the previous slice, the texture of the volume to be rendered is activated. Further, in the case of volume switching, if the two volumes use different transfer functions, the proper lookup texture is activated. Similarly, if different rendering modes are assigned to different volumes, and if there is a rendering mode change, the renderer changes the hardware settings appropriately.

```
RenderMultiVolumes( )
{
  while(!done( ))
  {
    FindNextSlice(z, volIdx);
    if(volIdx !=prevVolIdx)
      SetupTextures(volIdx);
    if(prevRenderMode !=currentRenderMode(volIdx))
      SetupHardwareForRenderingMode( )
    RenderSlice(z, volIdx);
  }
}
```

Arbitrary Number of Volumes with Arbitrary Size

Similar to previous works, we divide a large volume into bricks. In the current implementation, each volume is only represented by one texture. The content of the texture is updated from the proper brick before the slices from the brick are rendered. We may also have multiple textures for each volume. Typically, the total size of textures representing a volume is smaller than the actual size of the volume dataset. For a single volume, this is straightforward. First, the bricks are sorted in visibility order. Then, each brick is treated as a single volume and rendered.

For multiple unaligned volumes, the above process is much more complicated. We should guarantee that: (1) before calling RenderMultiVolumes( ), each brick texture is updated with the proper volume bricks; and (2) any visible portion of each volume is rendered once and only once. We should also avoid transferring the portion of volumes that are not rendered by the next calling of RenderMultiVolumes( ).

The following is the corresponding pseudo code for handling multiple bricks. We first number the volumes sequentially. The function RenderBrick( ) is called for each brick of volume n in visibility order. Then, for each brick of volume n, all the bricks of volume n+1 are processed by calling RenderBrick(volIndex+1). This satisfies the first requirement. To ensure no voxel is rendered more than one time, internal cut planes separating neighboring bricks are inserted. Currently, we only apply bricking along the Z direction, hence at most two cut planes are needed for each brick. The cut planes also help to reduce the cost for uploading textures. The sub-volumes inside a brick are tested against all the active cut planes. Only the unclipped portion of the brick is transferred.

```
RenderVolume(volIndex)
{
  if(volIndex<# of volumes)
  {
    Sort bricks in visibility order;
    For all bricks of volume[volIndex]
      RenderBrick(volIndex, brickIndex);
  } else
    RenderMultiVolumes( )
}
RenderBrick(volIndex, brickIndex)
{
  Load texture of the unclipped portion in Brick[brickIndex] of Volume[volIndex];
  Add 0~2 clip planes;
  RenderVolume(volIndex+1);
}
```

Fusion Rules Other than Blending

Figure 3:
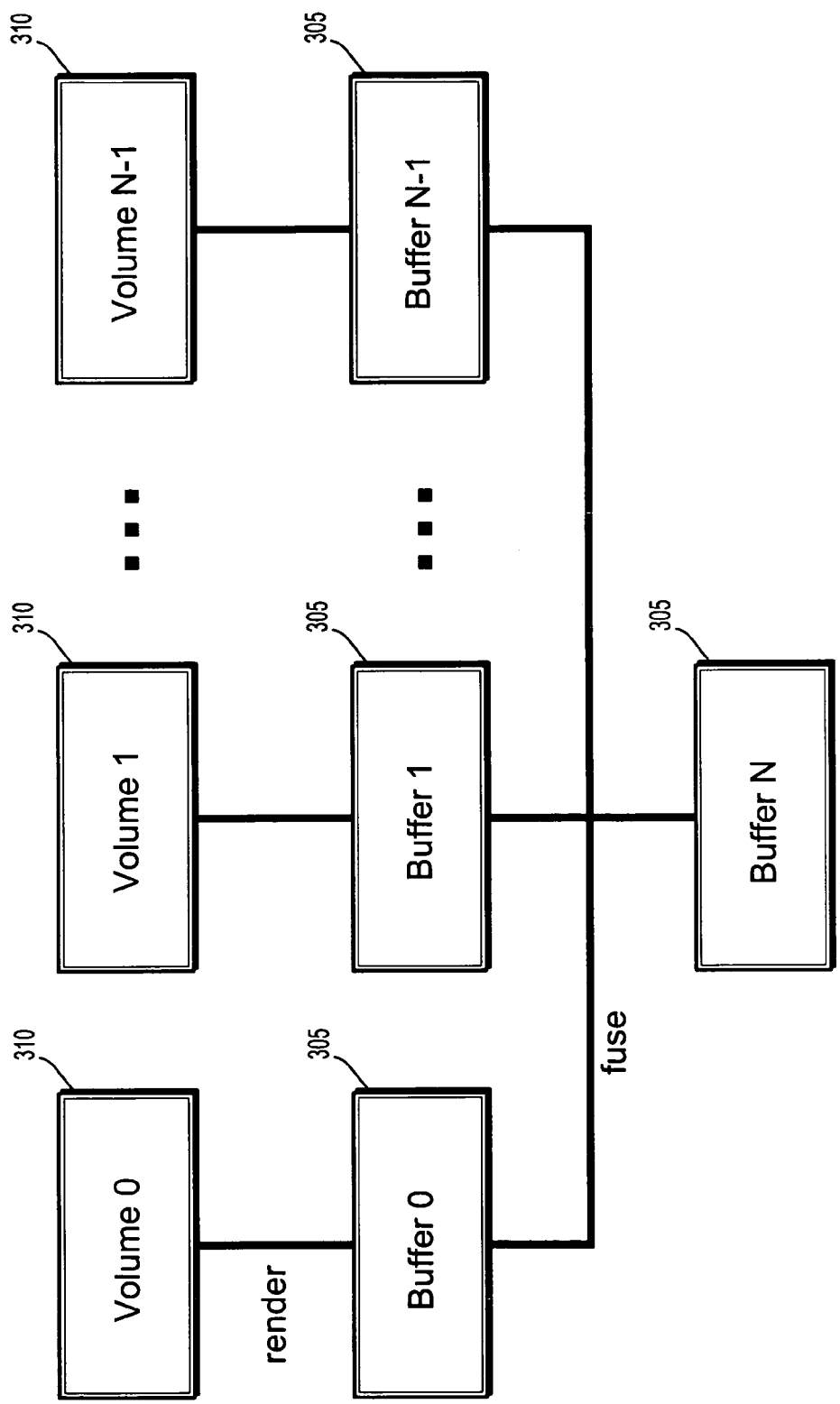
FIG. 3 depicts an exemplary block diagram illustrating an approach for supporting an arbitrary fusion rule, based on the usage of intermediate buffers, in accordance with one embodiment of the present invention.

To support arbitrary fusion rules, we have two approaches. Referring to FIG. 3, the first one needs intermediate off-screen buffers 305, one for each volume 310. For each slicing plane, one slice is extracted from each volume and stored in the corresponding off-screen buffer. Then the off-screen buffers are fused into a single buffer 315 using arbitrary fusion rules. This approach requires all the volumes use the same sampling distance, and the sampling locations from different volumes are aligned.

Figure 4:
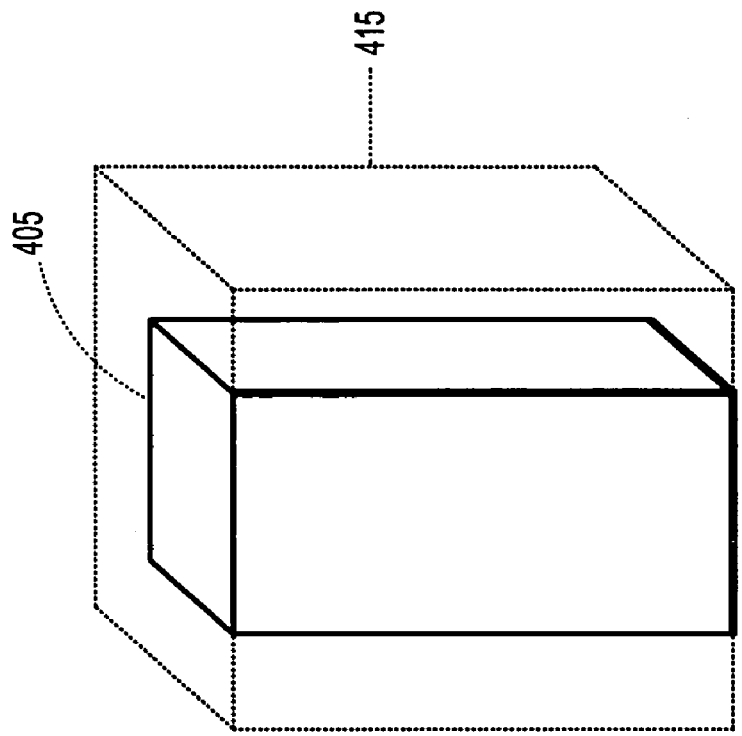
FIG. 4 depicts a pictorial diagram illustrating the effect of resizing the primary volume when another volume has a different orientation, in accordance with one embodiment of the present invention.
Figure 4:
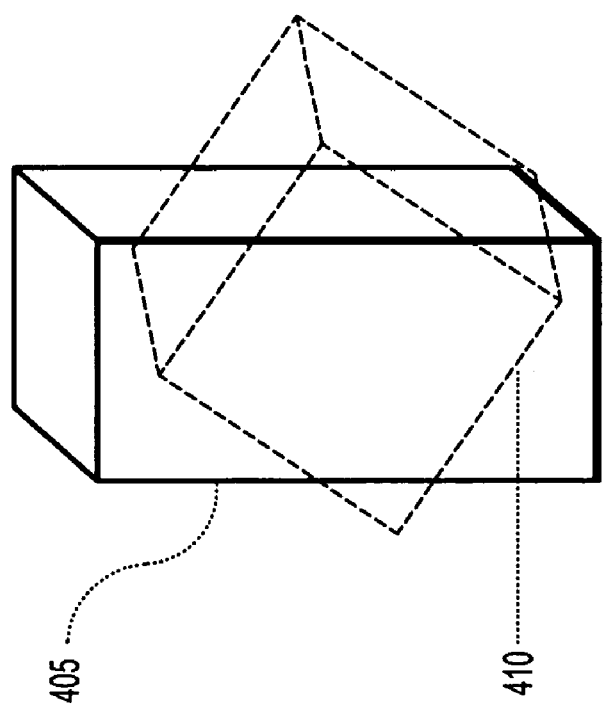

FIG. 4 shows the effect of resizing the primary volume when another volume has a different orientation. The diagram on the left shows the primary volume (i.e., reference volume 405) with solid lines and another volume (i.e., floating volume 410) with dashed lines. The diagram on the right shows the original primary volume 405 with solid lines (as before) and the re-sampled floating volume 415 with dotted lines.

The other approach is to rewrite the fusion rule into the following format:

fusion=vol[0]*fusion+~vol[0]*fusion=vol[0]*fusion+
  vol[1]*~vol[0]*fusion+~vol[0]*~vol[1]*fusion=
  vol[0]*fusion+vol[1]*~vol[0]*fusion+
  vol[2]*~vol[0]*~vol[1]*fusion= . . .

where "fusion" is the original fusion rule (i.e., the rule provided by the user). The term vol[0]*fusion is applied by rendering all the visible regions of vol[0], by activating textures of other volumes, and by executing a fragment program according the fusion rule. There may be regions outside the visible sub-volumes of vol[0] but covered by other volumes. The term ~vol[0] refers to those invisible sub-volumes of vol[0]. Assume that the transfer function always maps intensity value 0 to complete emptiness. We define ~vol[0] as tf(texel[0])=0; that is, the texels fetched from vol[0] is mapped to complete transparency. Therefore, vol[1]*~vol[0]*fusion is rendered by traversing the visible sub-volumes of vol[1] and applying the fusion rule of (tf(texel

[0])=0)*fusion. Similarly, vol[2]*~vol[0]*~vol[1]*fusion is applied by traversing all the visible sub-volumes of vol[2] and executing the ~vol[0]*~vol[1]*fusion. To guarantee that the texels fetched from outside of a texture satisfies tf(texel[0])=0, we use clamp_to_border as the border condition, and the border value set to zero.

CONCLUSION

In this invention, we have presented an accelerated, GPU-based fusion renderer that visualizes multiple overlapped volumetric datasets. The multiple volumes are fused on the fly during rendering and no resample of dataset on CPU is needed. The rendering parameters of each volume, such as the rotation, the translation, the shading mode, the sampling distance, the transfer function, the crop box, and the clip plane(s), are completely independent from other volumes, and can be changed without delays. In addition, the volumes can be of different resolutions.

The novel fusion renderer shows significant speedup and memory savings over previous methods. The acceleration is based on our slice-by-slice invisible space skipping technique, which produces identical image quality as if skipping was not present. The acceleration utilizes a pre-computed data structure, which is created independently for each volume. The invisible space skipping is also done independently for each volume. By default, the contributions from different volumes are alpha-blended. Further, the novel fusion renderer allows a user to specify fusion rules as to how these contributions can be combined. Such rules cannot be described by blending functions. The term "contributions" refer to the contributions from different volumes. Typically, each volume affects the rendered image through the volume's contributions.

Figure 5:
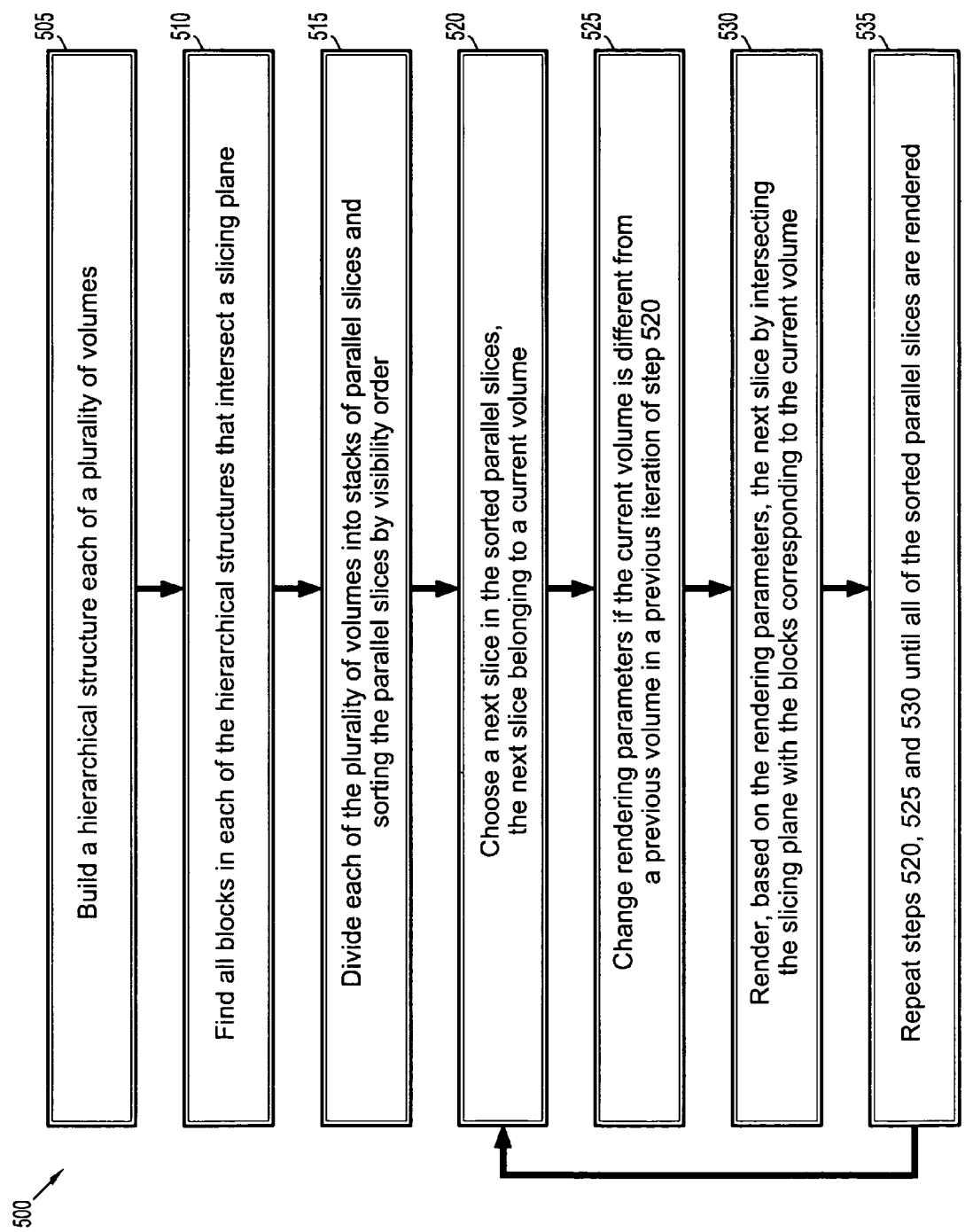
FIG. 5 depicts a flowchart illustrating an exemplary method of combining images to form a fused image.

Referring to FIG. 5, a flow diagram 500 is shown illustrating an exemplary method of combining two images to form a fused image. A hierarchical structure for each of a plurality of volumes is built (at 505). All blocks in each of the hierarchical structures that intersect a slicing plane are found (at 510). Each of the plurality of volumes is divided into stacks of parallel slices, and the parallel slices are sorted (at 515) by visibility order. A next slice in the sorted parallel slices is chosen (at 520). The next slice belongs (at 525) to a current volume. Rendering parameters are changed (at 530) if the current volume is different from a previous volume in a previous iteration of step 525. Based on the rendering parameters, the next slice is rendered (at 530) by intersecting the slicing plane with the blocks corresponding to the current volume. Steps 520, 525 and 530 are repeated (at 535) until all of the sorted parallel slices are rendered.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of combining two images to form a fused image, comprising:
    (a) building, by a processor, a hierarchical structure for each of a plurality of volumes;
    (b) finding, by a processor, all blocks in each of the hierarchical structures that intersect a slicing plane;
    (c) dividing, by a processor, each of the plurality of volumes into stacks of parallel slices and sorting the parallel slices by visibility order;
    (d) choosing, by a processor, a next slice in the sorted parallel slices, the next slice belonging to a current volume;
    (e) changing, by a processor, rendering parameters if the current volume is different from a previous volume in a previous iteration of step (d);
    (f) rendering, by a processor, based on the rendering parameters, the next slice by intersecting the slicing plane with the blocks corresponding to the current volume; and
    (g) repeating steps (d)-(f) until all of the sorted parallel slices of the current volume and the previous volume are rendered together in a fused image.

2. The method of claim 1, wherein the step (b) comprises: finding all blocks in each of the hierarchical structures that intersect a slicing plane while skipping invisible blocks by utilizing the slice-by-slice invisible space skipping approach described in the invention.

3. The method of claim 1, wherein the step (e) comprises: changing one of a transformation, a transfer function, a rendering mode, a crop box, or clip-planes.

4. The method of claim 1, further comprising:
receiving a fusion rule;
determining whether the fusion rule can be represented as a blending function.

5. The method of claim 4, further comprising:
if it is determined that a fusion rule can be represented as a blending function,
converting the fusion rule into the blending function.

6. The method of claim 4, further comprising:
if it is determined that fusion rule cannot be represented as a blending function,
uniformly setting a spacing for the parallel slices to the same value for each of the plurality of volumes,
storing each of the results of step (f) into an intermediate buffer associated with the current volume; and
blending the each of the results into a fused buffer using a fusion rule.

7. The method of claim 4, further comprising:
if it is determined that fusion rule cannot be represented as a blending function,
converting the fusion rule into a plurality of non-overlapping sub-rules, and
choosing one of the plurality of non-overlapping sub-rules.

8. The method of claim 1, further comprising:
dividing the volume into a plurality of bricks; and
repeating steps (c) to (g) for each of the plurality of bricks, wherein each of the plurality bricks is treated as a separate volume.

9. The method of claim 8, wherein the step of dividing the volume into a plurality of bricks, comprises:
dividing the volume into a plurality of bricks by inserting internal clip-planes boarding each of the plurality of bricks.

10. The method of claim 1, wherein the step of dividing each of the plurality of volumes into stacks of parallel slices, comprises:
independently setting a spacing for the parallel slices for each of the plurality of volumes.

11. The method of claim 1, wherein the step of dividing each of the plurality of volumes into stacks of parallel slices and sorting the parallel slices by visibility order, comprises:

virtually dividing each of the plurality of volumes into stacks of parallel slices and virtually sorting the parallel slices by visibility order.

12. A computer-readable medium having instructions stored thereon for combining two images to form a fused image, comprising the steps of:
    (a) building a hierarchical structure for each of a plurality of volumes;
    (b) finding all blocks in each of the hierarchical structures that intersect a slicing plane;
    (c) dividing each of the plurality of volumes into stacks of parallel slices and sorting the parallel slices by visibility order;
    (d) choosing a next slice in the sorted parallel slices, the next slice belonging to a current volume;
    (e) changing rendering parameters if the current volume is different from a previous volume in a previous iteration of step (d);
    (f) rendering, based on the rendering parameters, the next slice by intersecting the slicing plane with the blocks corresponding to the current volume; and
    (g) repeating steps (d)-(f) until all of the sorted parallel slices of the current volume and the previous volume are rendered together in a fused image.

13. The computer-readable medium of claim 12, wherein the step (b) comprises:
    finding all blocks in each of the hierarchical structures that intersect a slicing plane while skipping invisible blocks by utilizing the slice-by-slice invisible space skipping approach described in the invention.

14. The computer-readable medium of claim 12, further comprising:
    receiving a fusion rule;
    determining whether the fusion rule can be represented as a blending function.

15. The computer-readable medium of claim 14, further comprising:
    if it is determined that fusion rule cannot be represented as a blending function,
    uniformly setting a spacing for the parallel slices to the same value for each of the plurality of volumes,
    storing each of the results of step (f) into an intermediate buffer associated with the current volume; and
    blending the each of the results into a fused buffer using a fusion rule.

16. The computer-readable medium of claim 14, further comprising:
    if it is determined that fusion rule cannot be represented as a blending function,
    converting the fusion rule into a plurality of non-overlapping sub-rules, and
    choosing one of the plurality of non-overlapping sub-rules.

17. A system for forming a fused image, comprising:
    a texture-based fusion renderer comprising a processor and a memory for (a) building a hierarchical structure for each of a plurality of volumes;
    (b) finding all blocks in each of the hierarchical structures that intersect a slicing plane while skipping invisible blocks by utilizing the slice-by-slice invisible space skipping approach described in the invention;
    (c) dividing each of the plurality of volumes into stacks of parallel slices and sorting the parallel slices by visibility order;
    (d) choosing a next slice in the sorted parallel slices, the next slice belonging to a current volume;
    (e) changing rendering parameters if the current volume is different from a previous volume in a previous iteration of step (d);
    (f) rendering, based on the rendering parameters, the next slice by intersecting the slicing plane with the blocks corresponding to the current volume; and
    (g) repeating steps (d)-(f) until all of the sorted parallel slices of the current volume and the previous volume are rendered together in a fused image.

18. The system of claim 17, further comprising:
    receiving a fusion rule;
    determining whether the fusion rule can be represented as a blending function.

19. The system of claim 18, further comprising:
    if it is determined that fusion rule cannot be represented as a blending function,
    uniformly setting a spacing for the parallel slices to the same value for each of the plurality of volumes,
    storing each of the results of step (f) into an intermediate buffer associated with the current volume; and
    blending the each of the results into a fused buffer using a fusion rule.

20. The system of claim 18, further comprising:
    if it is determined that fusion rule cannot be represented as a blending function,
    converting the fusion rule into a plurality of non-overlapping sub-rules, and
    choosing one of the plurality of non-overlapping sub-rules.

* * * * *